United States Patent
Kottoor et al.

(10) Patent No.: US 12,223,552 B1
(45) Date of Patent: Feb. 11, 2025

(54) INGESTING, AUGMENTING, AND QUERYING RECORDS ACROSS USER ACCOUNTS

(71) Applicant: UIPCO, LLC, San Antonio, TX (US)

(72) Inventors: Mathew Cyriac Kottoor, San Antonio, TX (US); Gideon Bowie Luck, Wylie, TX (US); Pradeep R. Mangalagiri, Naperville, IL (US); Andrew Flores, San Antonio, TX (US); Iris Jordan, Farmers Branch, TX (US); Joseph H. Louwagie, III, San Antonio, TX (US)

(73) Assignees: UIPCO, LLC, San Antonio, TX (US); United Services Automobile Association (USAA), San Antonio, TX (US)

( * ) Notice: Subject to any disclaimer, the term of this patent is extended or adjusted under 35 U.S.C. 154(b) by 208 days.

(21) Appl. No.: 17/560,514

(22) Filed: Dec. 23, 2021

(51) Int. Cl.
  *G06Q 40/00* (2023.01)
  *G06F 16/2457* (2019.01)
  *G06F 16/25* (2019.01)
  *G06Q 40/12* (2023.01)

(52) U.S. Cl.
  CPC ....... *G06Q 40/12* (2013.12); *G06F 16/24573* (2019.01); *G06F 16/25* (2019.01)

(58) Field of Classification Search
  CPC ... G06Q 40/12; G06F 16/25; G06F 16/24573; G06F 16/3329; G06F 16/35; G06F 16/2457; G06F 16/24; G06N 20/00; G06N 3/08
  See application file for complete search history.

(56) References Cited

U.S. PATENT DOCUMENTS

| | | | | |
|---|---|---|---|---|
| 11,531,946 B2* | 12/2022 | Liu | ........................... | G06N 5/04 |
| 11,714,689 B2* | 8/2023 | Kiefer | ..................... | G06F 9/541 |
| | | | | 719/329 |
| 2020/0019561 A1* | 1/2020 | Doyle | .................... | G06F 16/287 |
| 2020/0293918 A1* | 9/2020 | Sanchez | .................. | G06F 18/22 |
| 2022/0277399 A1* | 9/2022 | Pei | .......................... | G06N 20/00 |
| 2022/0284013 A1* | 9/2022 | Panuganty | ............. | G06F 16/243 |
| 2022/0318925 A1* | 10/2022 | Pei | ......................... | G06N 3/045 |

(Continued)

FOREIGN PATENT DOCUMENTS

WO    WO-2021030609 A1 *   2/2021   ......... G06Q 20/3827

*Primary Examiner* — Florian M Zeender
*Assistant Examiner* — Milena Racic
(74) *Attorney, Agent, or Firm* — Potomac Law Group, PLLC; Dannon G. Allbee

(57) ABSTRACT

Implementations ingest records across multiple accounts hosted by different service providers and augment the records with metadata. For example, ingesting can include processing the records to identify transactions in the records and to discover additional aspects of the transactions. In some implementations, metadata can be used to augment the identified transactions in the records, where metadata can include a category, a digital receipt, a user tag such as a geotag, and other suitable metadata. The ingesting and augmenting the records can populate a coordination data structure with identified transactions and their associated data elements. These identified transactions can then be queried and a result set of transactions that span the different user accounts can be returned. In some implementations, the transactions can be queried using the augmented metadata, or other suitable pieces of information for the transactions.

20 Claims, 10 Drawing Sheets

(56) References Cited

U.S. PATENT DOCUMENTS

2022/0398583 A1* 12/2022 Crudele ............... G06Q 40/125
2023/0260017 A1* 8/2023 Benkreira ............ G06V 30/413
705/40

* cited by examiner

Transaction Search

Search Terms

Accounts to Search
- ☑ Checking Account 1
- ☐ Checking Account 2
- ☑ Savings Account A
- ☑ Savings Account XYZ
- ☑ Credit Card N
- ☐ Investment Account Q
- ☑ Credit Card M
- ☐ Credit Card C Search Criteria
Location: Sacramento, CA [Location Selector]
Transaction Amount: Min. [    ] Max. [    ]
Transaction Date: [7/2021] [12/2021]
Transaction Categories:
- ☑ Entertainment
- ☐ Housing
- ☑ Food/Drink
- ☐ Travel
- ☐ Investments
- ☑ Utilities

[Search]

*FIG. 5A*

INGESTING, AUGMENTING, AND QUERYING RECORDS ACROSS USER ACCOUNTS

TECHNICAL FIELD

The present disclosure is directed to techniques for ingesting, augmenting, and querying records across user accounts.

BACKGROUND

Users often have multiple accounts spread out across different service providers. Because of limited visibility, understanding the records from these disparate accounts and how transactions within these records relate to one another can be exceedingly difficult for a user. In addition, some service providers may have access to metadata or other suitable data capable of augmenting records that the remaining service providers lack. Because these systems have limited coordination, users suffer from siloed reporting that fails to provide an accurate status of the user's accounts overall.

BRIEF DESCRIPTION OF THE DRAWINGS

FIGS. 5A-5D are diagrams illustrating user interfaces that display queried records.

The techniques introduced here may be better understood by referring to the following Detailed Description in conjunction with the accompanying drawings, in which like reference numerals indicate identical or functionally similar elements.

DETAILED DESCRIPTION

Figure 1:
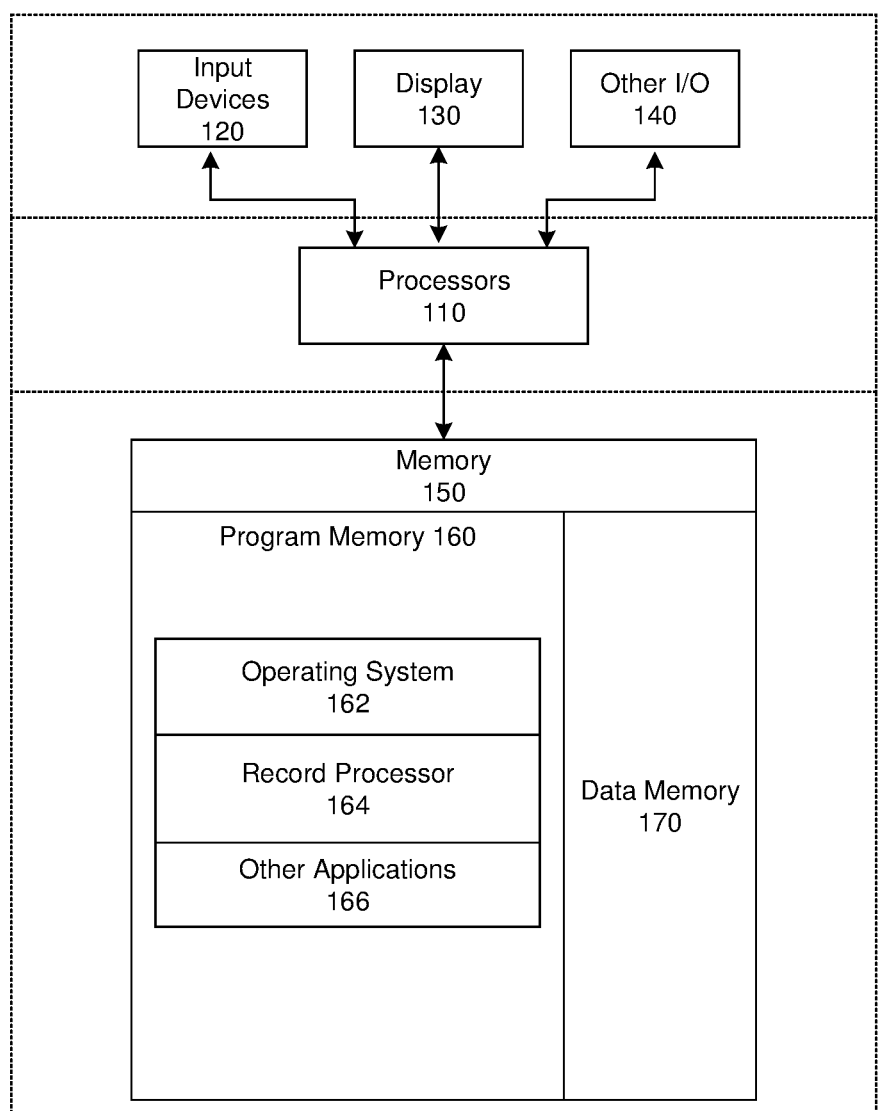
FIG. 1 is a block diagram illustrating an overview of devices on which some implementations can operate.

Aspects of the present disclosure are directed to techniques to ingest, augment, and query records across user accounts. For example, a user can have multiple accounts that are hosted by different service providers, and the multiple accounts can each have their own version of record keeping. In some implementations, transparency among the multiple accounts is limited, and therefore data access across the accounts is similarly limited.

Implementations ingest records across the multiple accounts and augment the records with metadata. For example, ingesting can include processing the records to identify transactions in the records and to discover additional aspects of the transactions. The additional aspects can include an entity party to the transaction and a sum for the transaction. In some implementations, metadata can be used to augment the identified transactions in the records. For example, the metadata can include a category for at least a portion of the identified transactions, a digital receipt (received from a user) associated with an identified transaction, a geotag, and/or other metadata.

In some implementations, the entity that is party to a transaction can be recognized using a set of rules, a machine learning model, or a combination thereof. For example, entities that are party to transactions can have minor deviations in the name or label listed for the transaction. Implementations can disambiguate entity names to recognize a parent entity. For example, a parent entity may have a number of variations associated with it, and when a transaction lists one of the variations the parent entity can be recognized for the transaction.

In some implementations, the category of a transaction can be recognized using a set of rules, a machine learning model, or a combination thereof. For example, certain transactions pose challenges for categorization. A transaction that lists a gas station entity may intuitively appear to be categorized as a gas purchase, however at times the purchase is actually from the attached convenience store (e.g., food and drink, entertainment, or other suitable categories). In this example, the sum for the transaction, when the user last purchased gas, typical gas purchase amounts for the user, etc., can be indicators as to whether the purchase was gas or something else. Implementations can learn categories for transactions. For example, user feedback can be received that categorizes certain transactions. The user feedback can be aggregated to develop a rule set and/or train a machine learning model that predicts a category for a transaction given its features.

Once the records are ingested and augmented, they can be queried using query parameters. For example, query results can return identified transactions across multiple accounts that are hosted by different service providers. In some implementations, the records can be queried using the additional aspects discovered about the identified transactions, such as by entity, or the metadata added to the transactions of a record.

Conventional systems fail to coordinate among different user accounts. For example, a conventional system can permit a user to query transactions from internal user accounts, however these systems are not able to ingest records from external user accounts that are hosted by other service provides. Nor do these conventional systems perform additional analysis on transactions from multiple accounts or allow users to view transactions from multiple accounts in the same set of search results. This limited visibility does not provide a user with an accurate overall account status.

Implementations improve access to records across different user accounts (hosted by different service providers) by permitting a user to retrieve query results of transactions from these different accounts. For example, ingesting and processing records from different user accounts can permit populating a coordination data structure that supports the cross-user account query results. In addition, a greater degree of context is added when transactions are augmented with new information that did not exist in the transaction's original record. Implementations improve the functioning of a computer at least because the coordination data structure supports data querying with greater levels of breadth. Further, the data augmentation that adds new data to transactions (that did not exist in the transactions original record) provides enhanced context and supports data querying with greater depth.

Moreover, the arrangement of computing systems and data structures described herein overcome the limitations of conventional systems. For example, implementations that leverage trained machine learning models convert big data stored in large databases to actionable trends stored in the trained models. Inferences from these trained models can predict relevant transaction information (e.g., categories and/or entities) without any need to communicate with the large database. In other words, the trained machine learning models efficiently power record ingesting and metadata augmentation using big data trends without the computing and overhead associated with accessing, querying, and analyzing large databases.

Several implementations are discussed below in more detail in reference to the figures. FIG. 1 is a block diagram illustrating an overview of devices on which some implementations of the disclosed technology can operate. The devices can comprise hardware components of a device 100 that ingest, augment, and query records across user accounts. Device 100 can include one or more input devices 120 that provide input to the Processor(s) 110 (e.g. CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, record processor 164, and other application programs 166. Memory 150 can also include data memory 170, e.g., users, users' accounts, records, metadata, training data, rules, algorithms, trained machine learning models, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
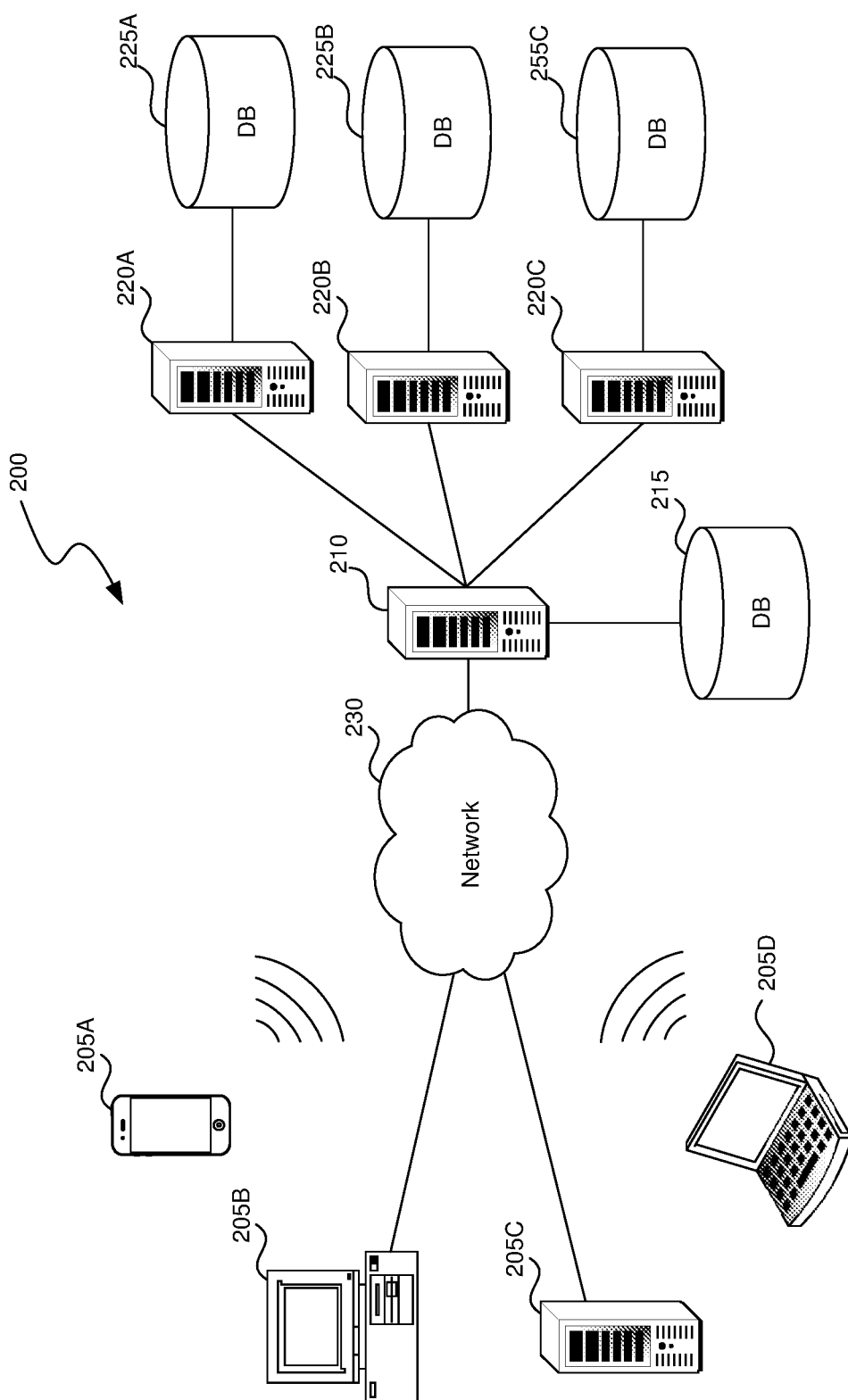
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information such as test results, monitored state data, historic monitored state data, rules, thresholds, and the like. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
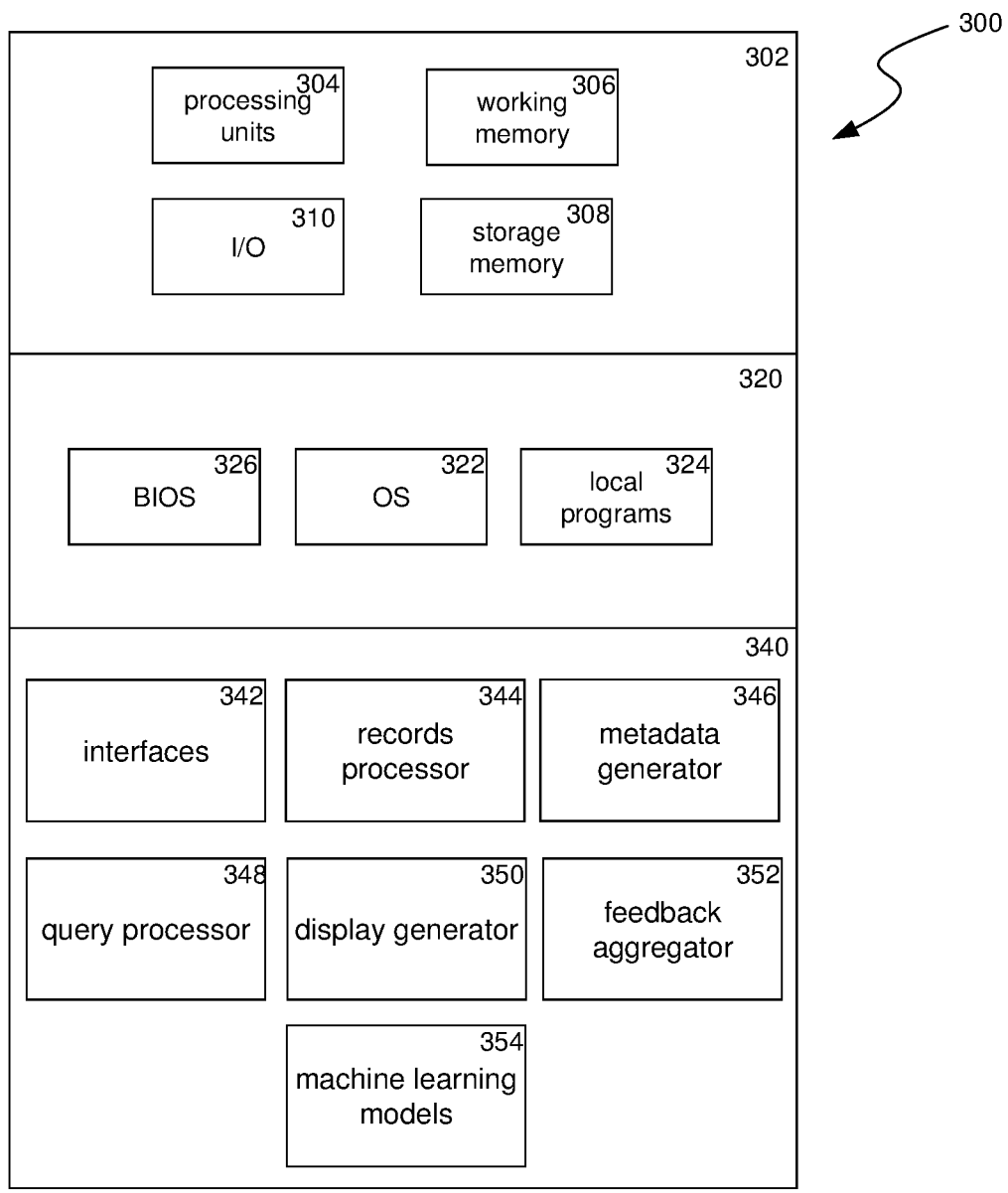
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g., CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include records processor 344, metadata generator 346, query processor 348, display generator 350, feedback aggregator 352, machine learning models 354, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

Records processor 344 can ingest the records from a variety of different accounts. For example, records processor 344 may manage a coordination data structure that supports coordination among the records of separate user accounts. The coordination data structure may contain identified transactions for these records, discovered data about the transactions, additional data about the transactions, and/or augmented data about the transactions.

While some records may be internal records such that systems are able to access structured data about the transactions in these records (e.g., date and time, entity, sum, etc.), other records can be from external service providers with less access to structured data. For example, external service providers may provide records with less detail or in a variety of formats. Some service provides may support application programming interfaces (APIs) that expose records and transactions within these records. Records from other service providers may be available through documents, such as statements or other similar documents that reflect transactions. Records processor 344 may be configured to process records in a variety of formats and populate the data structure that supports coordination.

For example, the structured data for internal records may readily provide certain pieces of data, such as transaction description, date and time, entity, sum, and others. However, records processor 344 may ingest internal records to discover additional information for the transactions, such as a parent entity or other discoverable information. For records that include semi-structured or unstructured data, records processor 344 may perform various types of processing to recognize relevant data for transactions. For example, optical character recognition ("OCR"), rule-based processing, machine learning (e.g., computer vision techniques), and other suitable processing techniques can be used to discover data about transactions present in the semi-structured data or unstructured data. In an example where a record is a statement document with a listing of transactions, OCR and computer vision can be used to recognize information such as transaction description, date and time, entity, sum, and other information readily present in a statement document. Semi-structured records can similarly be processed using a variety of techniques to discover transaction description, date and time, entity, sum, and other suitable information. In some implementations, a user may provide credentials for an external account and records process 344 can use the credentials to access a web interface for that account. Records process 344 can then scrape account information from the web interface, e.g., having been programmed to traverse a document object model (DOM) for the web interface to retrieve relevant account transactions and details. After discovery of this initial data about transactions from unstructured or semi-structured records, ingesting these records may also include discovery of additional information by records process 344 for the transactions, such as a parent entity for the transactions or other discoverable information.

Metadata generator 346 can generate metadata for transactions from records across a variety of user accounts. For example, metadata can include a derived category for transactions present in the coordination data structure. The category can be derived based on user feedback, predictions from a machine learning model, rule-based categorization, or a combination of these. In another example, metadata for transactions can also include a digital receipt for a transaction. For example, metadata generator 346 can receive a digital receipt, such as from a user through an app on the user's device, via an email transmitted to a predetermined email address pre-assigned for digital receipts from the user, or in any other suitable manner. The digital receipt can be processed, for example using OCR, rule-based processing, machine learning (e.g., computer vision techniques), and other suitable processing techniques to discover relevant information in the receipt, such as a date and time for the transaction, an amount for the transaction, an entity party to the transaction, and other suitable information. Metadata generator 346 can then automatically associate the digital receipt with a transaction present in the coordination data structure by matching the relevant pieces of information (e.g., date and time, amount, entity, etc.). Another example of metadata is a geotag. For example, a user's location can be known, such as using permitted location tracking of a user's device. Implementations can compare a date and time of known user locations with the dates and times of the transactions, and geotags can be added to matching transactions.

Query processor 348 can receive queries with query parameters and process the queries to retrieve relevant transactions. For example, query processor 348 can select against the coordination data structure to retrieve transactions that match the query parameters. For example, a query parameter may be a parent entity, and query processor 348 may retrieve transactions in the coordination data structure that match the parent entity. In another example, a query parameter may be an entity associated with a parent entity, and query processor 348 may determine the parent entity for the received entity and retrieve transactions, in the coordination data structure, that match the parent entity. In another example, a query parameter may be a category and a date window, and query processor 348 may retrieve transactions in the coordination data structure that match the category with dates within the date window. Query processor 348 may process structured query language ("SQL") queries, or any other suitable queries configured to retrieve data from the coordination data structure. Because the coordination data structure holds data for transactions across records from multiple user accounts and service providers, query processor 348 can generate query results from transactions across multiple user accounts and service providers.

Display generator 350 can generate displays, such as user interfaces with query results returned by query processor 348. For example, the displays can include user interfaces with dynamic elements, such as web components that can be expanded or minimized. In some implementations, display generator 350 can generates graphs that display data from the coordination data structure according to certain data aspects (e.g., by category, entity, date, and other suitable data aspects).

Feedback aggregator 352 can aggregate user feedback received about the transactions stored in the coordination data structure. For example, feedback can be received from users about the categories for certain transactions and/or the parent entities for certain transactions. In some implementations, the feedback can correct a predicted category or parent entity for transactions. Feedback aggregator 352 can aggregate and process the feedback, for example to develop training data for machine learning models 354.

In some implementations, feedback aggregator 352 can utilize digital receipts to aggregate feedback about parent entities. For example, a digital receipt may include additional information that identifies a particular entity party to the transaction. The digital receipt can be further processed to determine a parent entity using this additional information such that the parent entity can be associated with the transaction identified by the digital receipt. The parent entity can then be added to the automatically identified transactions for the digital receipt. The original entity for the identified transaction and the parent entity for the identified transaction can serve as feedback and this feedback can be aggregated by feedback aggregator 352.

Machine learning models 354 can be any machine learning model suitable for predicting one or more of: a category for transactions, a parent entity for transactions, and other suitable information. In some implementations, machine learning models 348 can be configured or trained using historic data that includes features from past transactions, past determined entities, past determined categories, and any other suitable historic data. Machine learning models 348 can be supervised learning models, unsupervised learning models, or other models that can learn from the historic data.

Figure 4:
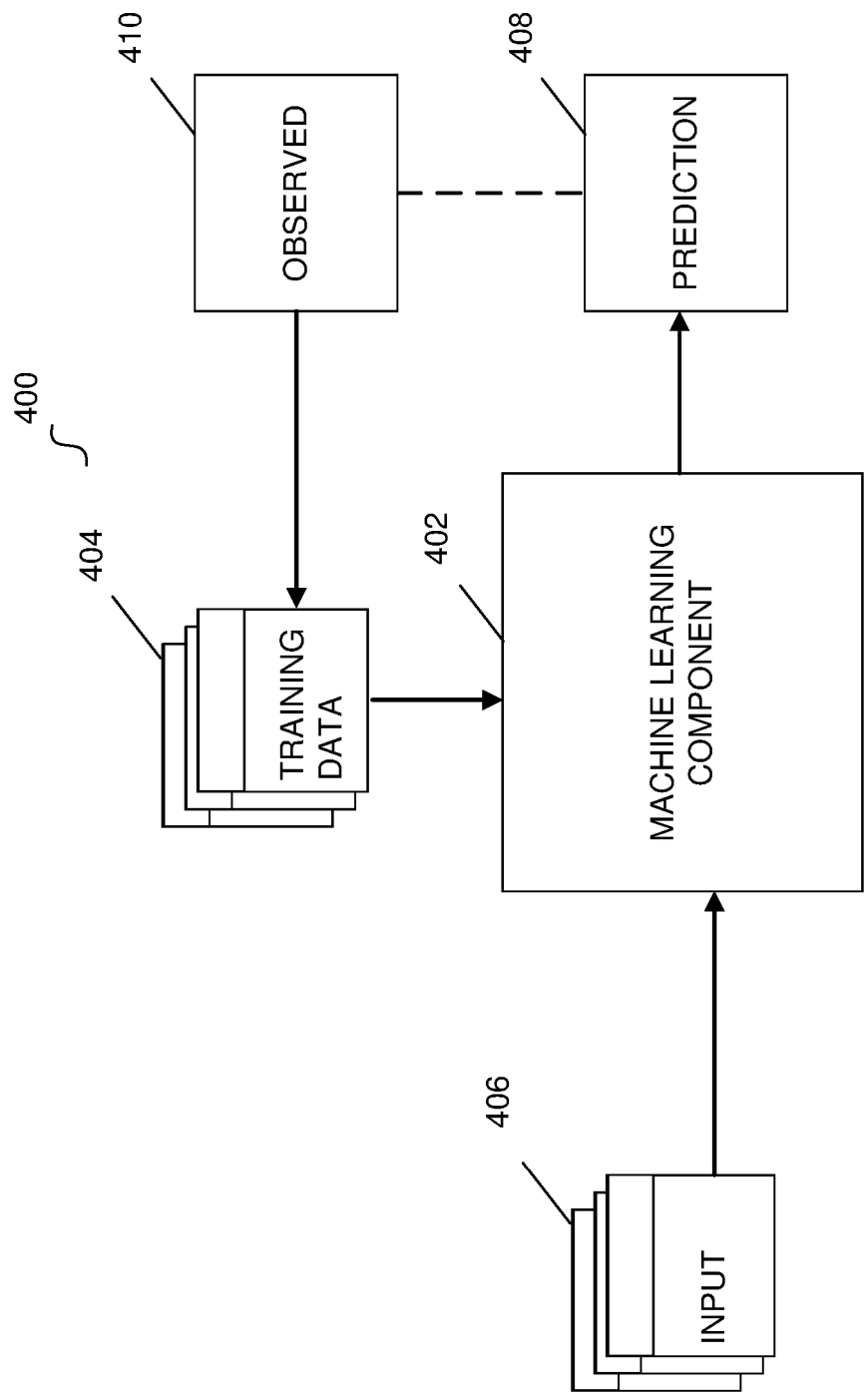
FIG. 4 is a system diagram illustrating components of a machine learning system.
Figure 5B:
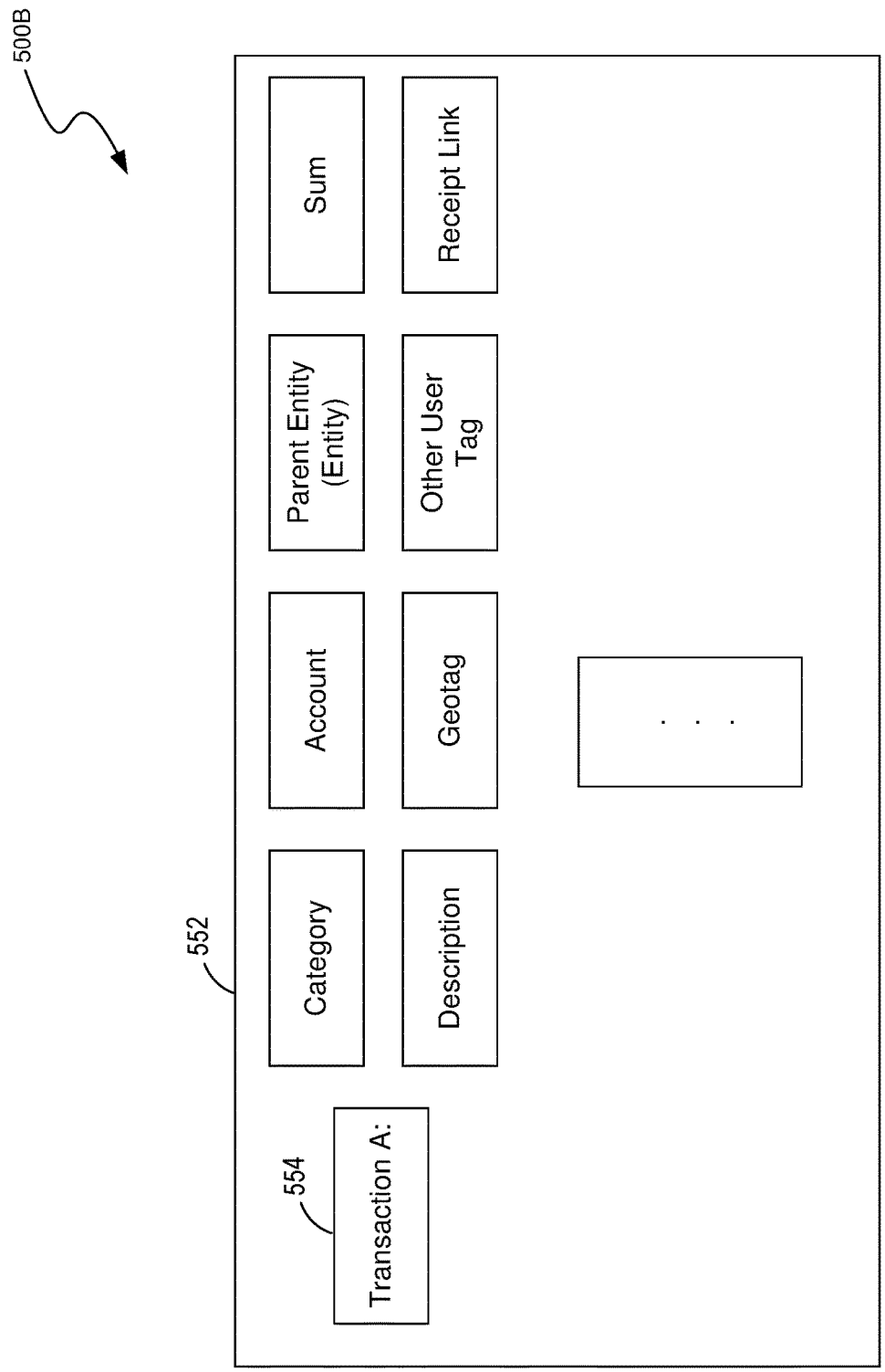
Figure 5C:
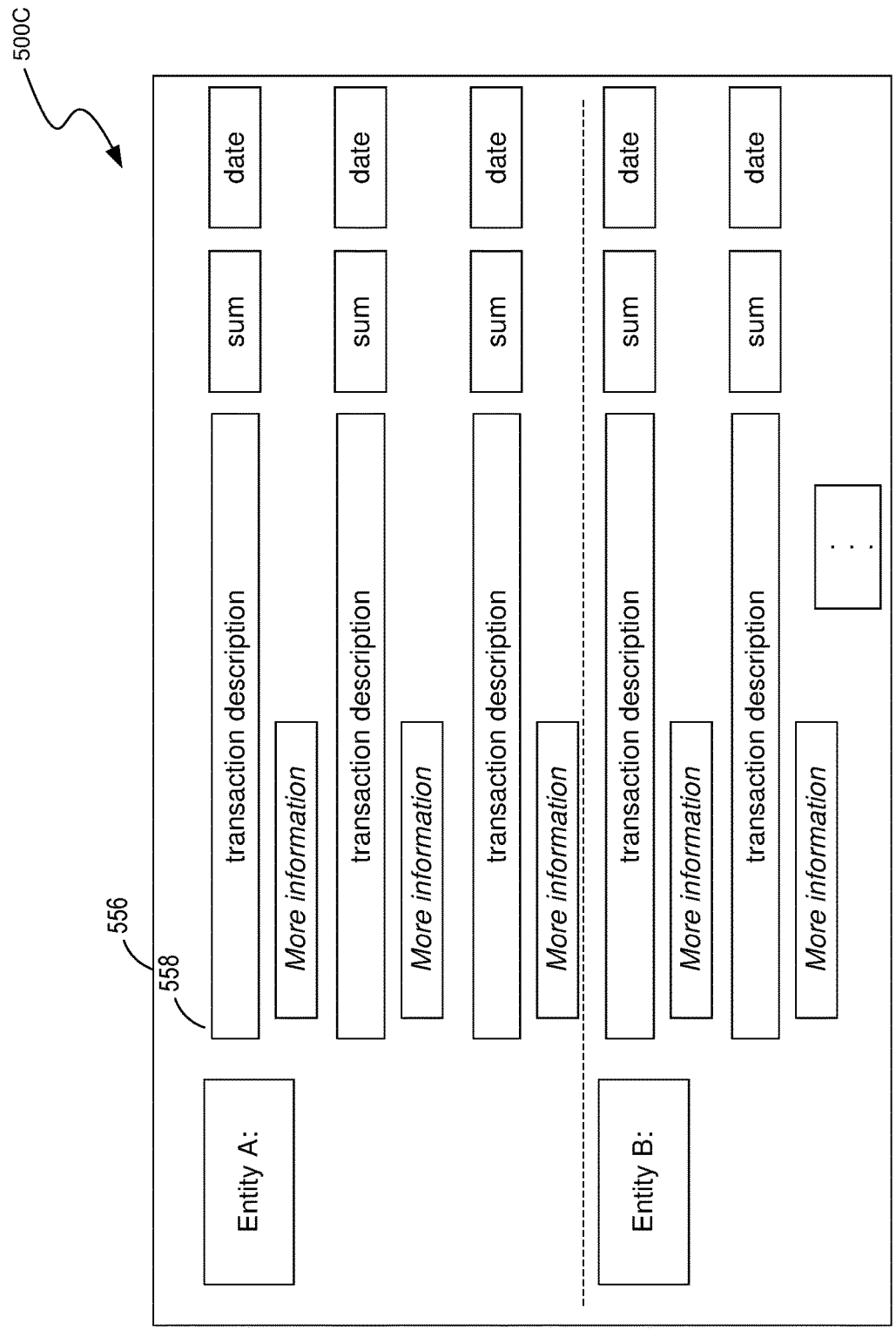
Figure 5D:
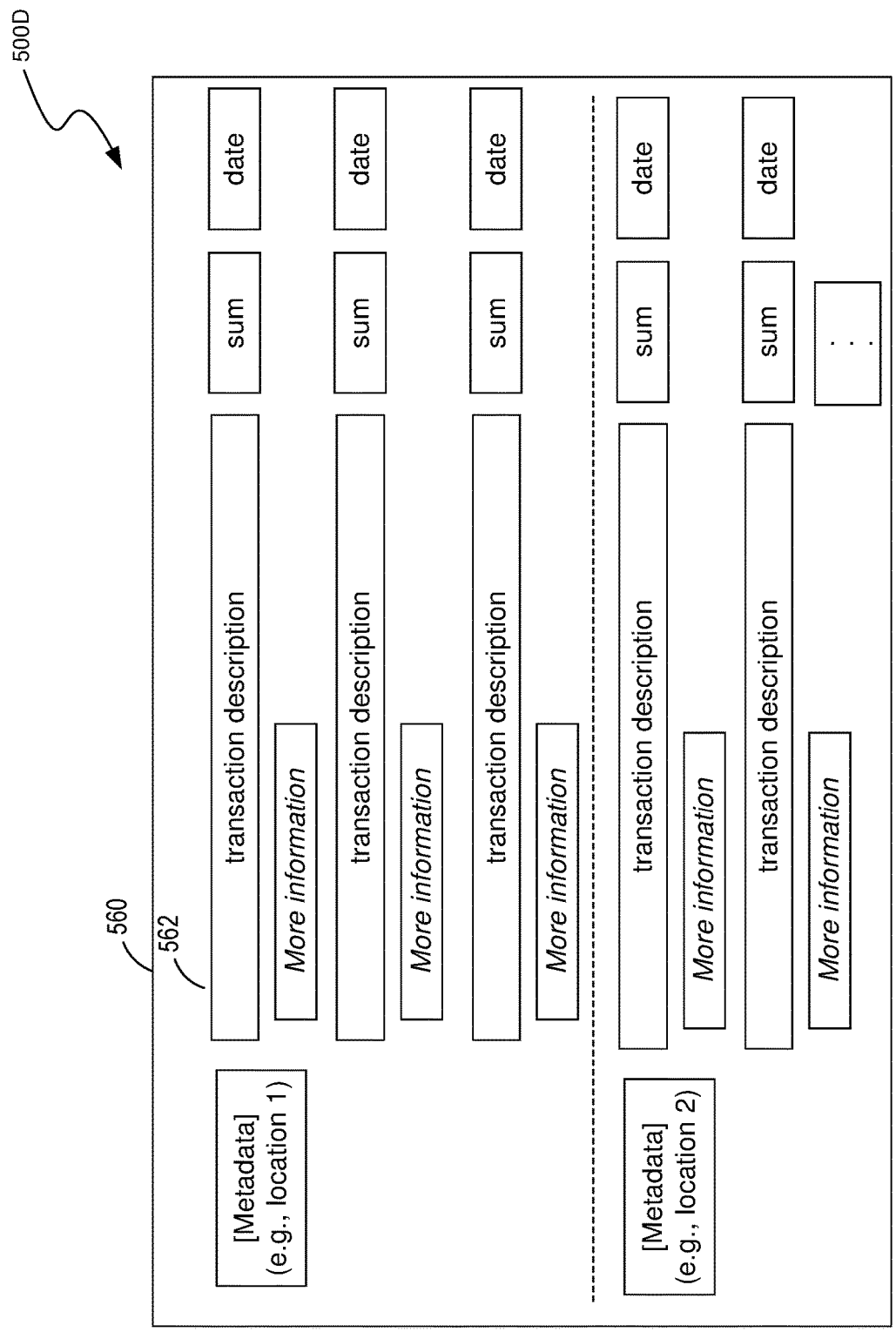

FIG. 4 is a system diagram illustrating components of a machine learning system. System 400 includes machine learning component 402, training data 404, input data 406, prediction 408, and observed data 410. Machine learning component 402 can be a designed model that includes one or more machine learning elements (e.g., a neural network, support vector machine, Bayesian network, random forest classifier, gradient boosting classifier, and the like). Training data 404 can be any set of data capable of training machine learning component 402 (e.g., a set of features with corresponding labels, such as labeled data for supervised learning). Training data 304 can be used to train machine learning component 302 to generate a trained machine learning model.

Machine learning component 402 of FIG. 4 can be implemented by records processor 164 of FIG. 1 and/or machine learning models 354 of FIG. 3. For example, a trained machine learning model may be configured to predict a category for a transaction and/or an entity party to the transaction. Predictions 408 can be generated using input 406, which includes features of a transaction (e.g., date and time, description, entity, sum, metadata, another suitable features). In an example, training data 404 can include instances of historic data including: previous transactions (e.g., descriptions, date and time, sum and other transaction data), derived entities, derived categories, labeled entities, and/or labeled categories. Accordingly, prediction 408 generated by machine learning component 402 trained by versions of training data 404 can be predicted entities and/or categories for a transaction.

In some implementations, results for the predictions can be observed. For example, a user can manually enter a category or entity for a transaction (or a digital receipt may provide a category or entity after processing). The user can provide this feedback to either correct a predicted category or entity or in advance of the prediction. The feedback can be retrieved (e.g., represented in FIG. 4 as observed data 410), and this feedback can be processed to update training data 404. For example, training data 404 can be updated to include new instances of training data, new labels, and other updates. This updated training data 404 can be used to re-train, update the training of, and/or train a new version of machine learning component 402.

The design of machine learning component 402 can include any suitable machine learning model components (e.g., a neural network, support vector machine, specialized regression model, random forest classifier, gradient boosting classifier, and the like). For example, a neural network can be implemented along with a given cost function (e.g., for training/gradient calculation). The neural network can include any number of hidden layers (e.g., 0, 1, 2, 3, or many more), and can include feed forward neural networks, recurrent neural networks, convolution neural networks, modular neural networks, and any other suitable type. In some implementations, the neural network can be configured for deep learning, for example based on the number of hidden layers implemented. In some examples, a Bayesian network can be similarly implemented, or other types of supervised learning models.

For example, a support vector machine can be implemented, in some instances along with one or more kernels (e.g., gaussian kernel, linear kernel, and the like). In some implementations, a k-nearest neighbor ("KNN") algorithm can be implemented. For example, a KNN algorithm can determine a distance between input features (e.g., features for a new transaction, represented by input 406) and historic training data instances (e.g., training data instances of transactions with labels). One or more "nearest neighbors" relative to this distance can be determined (the number of neighbors can be based on a value selected for K). In some implementations, the determined nearest neighbors can have features similar to the input features (e.g., instances of training data that successfully reached the goal with few or no deviations). Prediction 408 can then be generated based on the distances from these "nearest neighbor" instances and their entity and/or category.

In some implementations, machine learning component 402 can include an ensemble learning model. For example, machine learning component 402 can include a random forest classifier that includes multiple machine learning components whose predictions are combined. Implementations of the random forest classifier include decision trees that are trained by training data 404 (e.g., using subsets of the training data per tree). The random forest algorithm can then aggregate votes from these decision trees to arrive at a prediction.

In some implementations, machine learning model 402 can include a gradient boosting learning algorithm, such as XGBoost. The gradient boosting algorithm can similarly leverage an ensemble learning technique with multiple decision trees trained using training data 404, however the gradient boosting algorithm can align decision trees in sequence. In this implementation, a tree later in the sequence learns to "correct" errors from predictions generated by earlier decision trees. The gradient boosting learning algorithm aggregates predictions generated by the individual decision trees to generate prediction 408. Individual decision trees can be trained using a recursive splitting algorithm that splits nodes of the tree (e.g., recursive binary splitting), or any other suitable training technique.

Machine learning component 402 can be multiple models stacked, for example with the output of a first model feeding into the input of a second model. Some implementations can include a number of layers of prediction models. Features utilized by machine learning component 402 can also be determined. For example, feature engineering can be used to generate a set of features implemented by one or more machine learning models.

In some implementations, the design of machine learning component 402 can be tuned during training, retraining, and/or updated training. For example, tuning can include adjusting a number of hidden layers in a neural network, adjusting a kernel calculation used to implement a support vector machine, and the like. This tuning can also include adjusting/selecting features used by the machine learning model. Various tuning configurations (e.g., different versions of the machine learning model and features) can be implemented while training in order to arrive at a configuration for machine learning component 402 that, when trained, achieves desired performance (e.g., performs predictions at a desired level of accuracy, run according to desired resource utilization/time metrics, and the like). Retraining and updating the training of machine learning component 402 can include training the model with updated training data. For example, the training data can be updated to incorporate observed data, or data that has otherwise been labeled (e.g., for use with supervised learning).

In some implementations, machine learning component 402 can include an unsupervised learning component. For example, one or more clustering algorithms, such as hierarchical clustering, k-means clustering, and the like, or unsupervised neural networks, such as an unsupervised autoencoder, can be implemented. For example, historic data that includes transaction features and labels (e.g., entity and/or category labels) can be input to the unsupervised learning component to learn aspects of the data, such as clusters that relate features to labels.

Implementations provide visibility across multiple user accounts hosted by different service provides by ingesting, augmenting, and querying records from these accounts. For example, a first user account may be a credit card account from a first service provider while a second user account may be a debit card account from a credit union or bank. Records from these accounts may be ingested such that transactions are identified. The ingesting can include document processing techniques (e.g., OCR, computer vision, rules-based processing, etc.), database accesses (e.g., for accounts hosed by an entity in control of the record processor 164), web scraping, API queries, and/or structured or semi-structured data querying to discover information about the transactions. The information about the transactions can include a date and time, a description of the transaction, sum (e.g., monetary amount), and other suitable transactions information. In some embodiments, the ingesting can include discovery of additional information, such as a parent entity for the transaction.

For example, entities party to a transaction that are listed in records can often contain variations even though they refer to the same entity. Implementations can disambiguate certain entities to discover a parent entity for transactions. For example, machine learning, a rule-based technique, or a combination of these can be used to predict a parent entity for a transaction. Because the parent entity captures multiple variations, different transactions that include one of the entity variations can be grouped.

Identified transactions within the ingested records can also be augmented, for example with metadata that enhances the context for the transactions. An example piece of metadata is a category. For example, the features of the transaction may be used to predict a category and/or a user may label the transaction with a category. Another example piece of metadata is a received digital receipt that is associated with the transaction. Another piece of metadata is a geotag, such as a tag that indicates a user location when the transaction took place. Any other user related tag or suitable piece of metadata can be used to augment the transactions. In some embodiments, the ingesting and augmenting of the records and identified transactions can populate a data structure that supports coordination among the different user accounts.

FIGS. 5A-5D are diagrams illustrating user interfaces that display queried records. Diagram 500A includes user interface 502 for searching transactions across multiple accounts with augmented metadata. Diagram 500B includes user interface 552 and transaction 554, diagram 500C includes user interface 556 and result set 558, and diagram 500D includes user interface 560 and result set 562. Transaction 554 and result sets 558 and 562 are example transactions in user interfaces 552, 556, and 560, and query results often includes several additional transactions.

Diagram 500A includes user interface 502 for searching transactions across multiple accounts with augmented metadata. User interface 502 includes an area 504 for entering search terms, such as names of entities in a transaction (e.g., seller), transaction description, amount, etc.; an area 506 for selecting which linked and native accounts to perform transaction searches against; additional metadata selector 508 for selecting, e.g., a location for transactions, a transaction amount minimum and maximum, a transaction date minimum and maximum, and transaction categories to match to metadata assigned to transaction; and a search button 510 for initiating a search. From these user entries, the system can create query parameters for a query. An example query parameters for a query include: (AccountID='1' OR '3' OR '4' OR '5' OR '7') AND (Location="Sacramento, CA") AND (Category='Food and Drink' OR 'Entertainment' OR 'Utilities') AND (July 2021<=Date<=December 2021). Any other suitable query format and querying processing can be implemented. Accordingly, transactions identified by ingesting and augmenting records from multiple user accounts hosted by different services providers can be jointly queried.

Transaction 554 lists several pieces of information and metadata for a transaction discovered or generated by the ingesting and augmenting of data records. For example, the displayed description, account, and sum for the transactions can be determined from the records by the ingesting. In addition, the parent entity can be discovered based on the entity listed in the ingested records and techniques to abstract the listed entity into a parent entity. The displayed category, receipt link, geotag, and other user tag can be pieces of metadata used to augment the transaction. Accordingly, user interface 552 can display, for transaction 554, information from the existing account record (e.g., description, sum), discovered information using the existing account information (e.g., a discovered parent entity), and/or metadata added to the information from the existing account for the transactions that enhances the context for the transaction (e.g., category, geotag, receipt link, other user tag).

In some implementations, user interface 552 can illustrate query results from a query of the ingested and augmented transactions (e.g., provided through user interface 502). For example, transactions can be queried using any suitable piece of information displayed for the transaction in user interface 552 (e.g., information from the existing account record, discovered information using the existing account information, and/or metadata). In some implementations, the pieces of information for an ingested and augmented transaction can be stored in a data structure that supports coordination among the different user accounts, where the pieces of information are columns of the data structure. Accordingly, a query parameter can define a piece of information (e.g., column of the data structure) and data value matching criteria. Query parameters can be combined with logical operators to generate a query.

User interface 556 illustrates result set 558 grouped by Entity. For example, query results can be grouped by any suitable piece of information for a transaction, including the entity and/or discovered parent entity for the transaction. Result set 558 grouped by Entity can be any suitable query results. For example, existing query results can be further refined by selecting a parent entity or the query parameters may have included the parent entity to match against. Similarly, user interface 560 illustrates result set 562 grouped by any suitable piece of metadata. For example, result set 562 can be grouped by category, geographic region (location), or any other suitable piece of metadata. Result set 562 grouped by category can be any suitable query results. For example, existing query results can be further refined by selecting a piece of metadata or the query parameters may have included the metadata to match against.

In some implementations, a geotag for a transaction may include an generalized geographic region determined based on the user device's location when the transaction was performed. For example, the size of a geographic region can range from a square mile to several square miles, a particular shopping center, town, state, country, etc. In this example, the geographic region may cover an area relevant to grouping that informs a user's spending habits, such as a mall, a shopping area or group of stores, an entertainment venue, a group of restaurants, and the like. When a transaction is displayed with a geotag, the web component that displays the geotag may include a popover (e.g., mouseover triggered user interface element) that permits searching for other transactions in the same geographic region. When a user selects this mechanism for searching, the coordination data structure can be queried using a query parameter of geotag and the previous transactions geographic region as the data value. The result set can then display the user's other transactions with matching geotag values. The user can further refine the transactions result set, for example by selecting a "Dining" category to refine the results. In this example, the user may be able to assess spending habits when dining in a certain geographic region (e.g., at a newly constructed retail center).

In some implementations, the geotag for a transaction may be a GPS position (e.g., not a geographic area) and the mechanism for searching for other transactions in a similar geographic area can involve logic that compares GPS positions. For example, a threshold (e.g., square mile, two square miles, or other thresholds) may be used to determine which GPS locations qualify as similar.

Those skilled in the art will appreciate that the components illustrated in FIGS. 1-5 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 6:
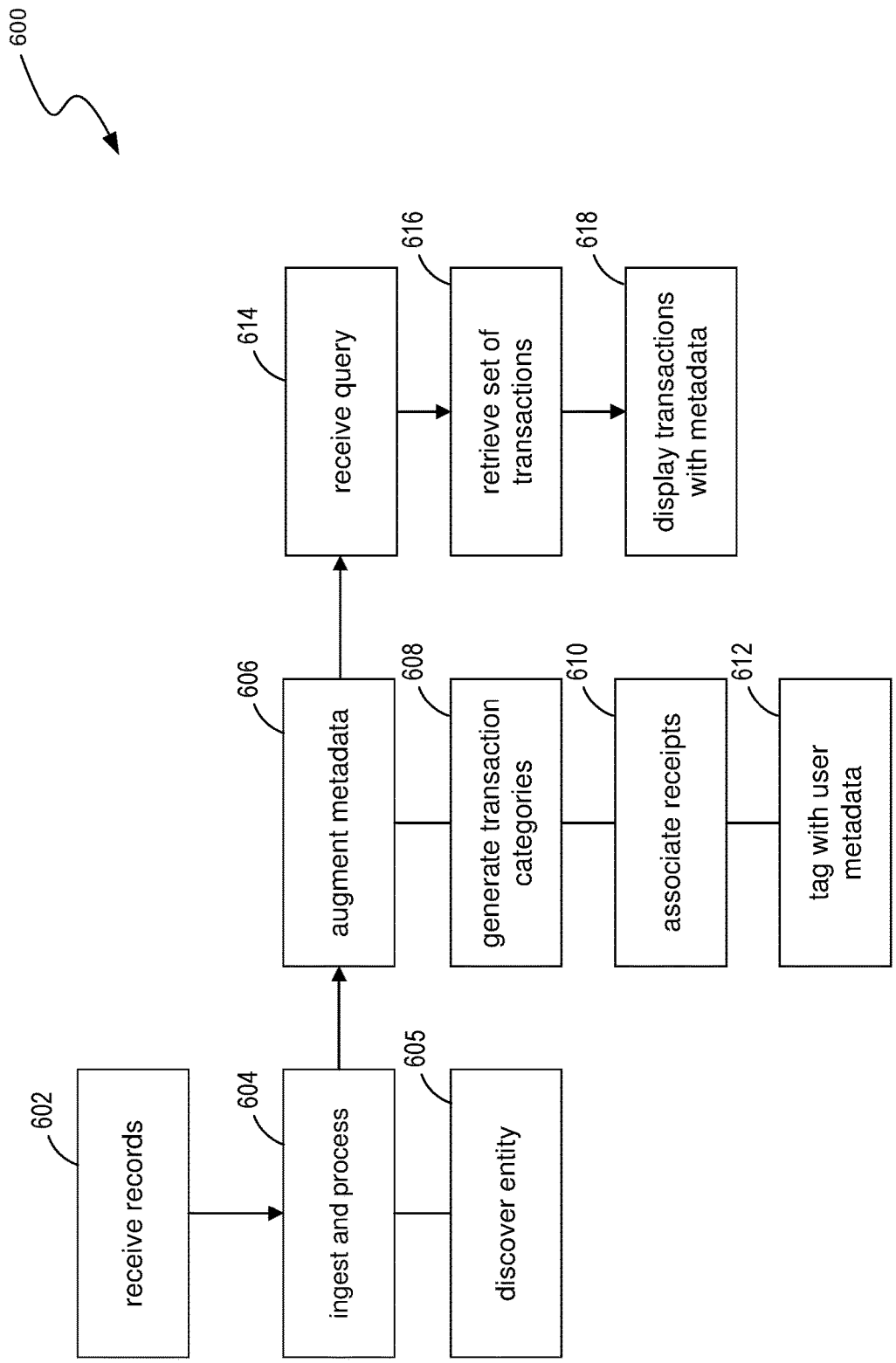
FIG. 6 is a flowchart illustrating components used in some implementations for ingesting, augmenting, and querying records across user accounts.

FIG. 6 is a flowchart illustrating a process 600 used in some implementations for ingesting, augmenting, and querying records across user accounts. In some implementations, process 600 is performed for a user account. Process 600 can be triggered in response to a user having one or more accounts registered with a record processor (e.g., causing blocks 602-612 for gathering account data and transactions) and can be further triggered when a user executes a transaction search (e.g., through a website or app interface—causing block 614-618 to be performed)

At block 602, process 600 can receive records from different user accounts. For example, the different user accounts can be hosted by different service providers and may permit limited coordination among them. The records from the different user accounts can be in a variety of formats. For example, the records can be structured, semi-structed, or unstructured. In some implementations, the user accounts are financial accounts, such as credit cards, bank cards, and other suitable spending accounts, and the records contain transactions performed with these spending accounts. In various implementations, the accounts can be native accounts hosted by the entity in control of the records processor 164 and/or can be external accounts (e.g., where a user provides account statements or credentials to access an account API or to scrape account details and transactions from a web interface).

At 604, process 600 ingests and processes records from a plurality of user accounts. For example, records in a variety of formats (e.g., structured, semi-structured, unstructured) can be received and these records can be ingested and processed. Structured records (e.g., records from internal user accounts) may readily provide certain pieces of data, such as transaction description, date and time, entity, sum, and others. Native structured records can be processed to discover additional information for the transactions, such as a parent entity or other discoverable information.

For records that include semi-structured or unstructured data, various types of processing can be performed to recognize relevant data for transactions. For example, OCR, rule-based processing, machine learning (e.g., computer vision techniques), and other suitable processing techniques can be used to discover data about transactions present in the semi-structured data or unstructured data, e.g., at block 605. In an example where a record is a statement document with a listing of transactions, OCR and computer vision can be used to recognize information such as transaction description, date and time, entity, sum, and other information readily present in a statement document. In some implementations, a user may provide credentials for an external account and discover entity 605 can use the credentials to access a web interface for that account. Discover entity 605 can then access and API or scrape account information from the web interface, e.g., having been programmed to traverse a document object model (DOM), HTML, or other information gathered via the web interface to retrieve relevant account transactions and details. Semi-structured records can similarly be processed using a variety of techniques to discover transaction description, date and time, entity, sum, and other suitable information. After discovery of this initial data about transactions from unstructured or semi-structured records, ingesting these records may also include discovery of additional information for the transactions, such as a parent entity for the transactions or other discoverable information.

Discovering a parent entity for a transaction, by discover entity 605, can include disambiguating entity variations to a parent entity. For example, machine learning, a rule-based technique, or a combination of these can be used to predict a parent entity for a transaction. Often, entities listed in user account records indicate a same overall entity but include variations in the entity name or label listed. Implementations disambiguate the overall entity (e.g., parent entity), for example using historical data. The historical data can associate certain varieties of an entity with a parent. Trends, such as the types of variations that occur in listed entities, can be learned, such as by a machine learning model. Rules an also be created based on the trends. These techniques can be then be used to disambiguate a parent entity for some transactions. Because the parent entity captures multiple variations, different transactions that include one of the entity variations can be grouped using the disambiguated parent entity.

In some implementations, the ingesting and populating can be used to populate a data structure that supports coordination. For example, the coordination data structure an include transactions as entries (e.g., rows) in the data structure and pieces of transaction related information as data fields (e.g., columns) in the data structure. In some implementations, at least two of the user accounts are hosted by different service providers.

At block 606, process 600 augments the transactions with metadata. An example piece of metadata can be a derived/predicted category for identified transactions (e.g., transactions in the coordination data structure). At block 608, process 600 generates a category for at least a portion of the identified transactions. The category can be derived based on user feedback and/or predicted based on predictions from a machine learning model, rule-based categorization, or a combination of these.

Another example piece of metadata can be a digital receipt. At block 610, process 600 augments at least a portion of the transactions with digital receipt metadata. In another example, metadata for transactions can also include a digital receipt for a transaction. For example, a received digital receipt can be processed (e.g., using OCR, rule-based processing, computer vision techniques, and other suitable processing techniques) to discover relevant information in the receipt, such as a date and time for the transaction, an amount for the transaction, an entity party to the transaction, and other suitable information. The digital receipt can be automatically associated with a transaction present in the coordination data structure by matching the relevant pieces of information (e.g., date and time, amount, entity, etc.) A digital receipt can be received, such as from a user through an application on the user's device, via an email transmitted to a predetermined email address pre-assigned for digital receipts from the user, or in any other suitable manner.

Other example pieces of metadata can be user metadata for a transaction. At block 612, process 600 generates metadata for at least a portion of the transactions. For example, metadata can include a geotag. An application on a user's phone can track the user's location (with permission from the user). Because the application has location information about the user, the user's location can be correlated with the date and time for transactions in the records. Matching transactions can be augmented with the user location (e.g., geotag). The location information can take any suitable form, such as global positioning system ("GPS") format. In some implementations, the user's location can be generalized to a broader geographic region (e.g., a geographic region that covers an area of GPS locations), and the augmented metadata can be this broader region.

At block 614, process 600 receives a query with query parameters. For example, transactions can be queried using any suitable piece of information within the populated coordination data structure (e.g., pieces of information as illustrated in FIG. 5A). An example query parameter can define a piece of information (e.g., column of the data structure) and data value matching criteria. Query parameters can be combined with logical operators to generate a query.

At block 616, process 600 retrieves a set of transactions using the query parameters. Example query parameters for a query include: Entity='XYZ Corporation' AND Sum>=$100. Here, transactions that match the XYZ Corporation entity and that have a sum greater than or equal to $100 will be returned. Any other suitable query format and querying processing can be implemented. Accordingly, transactions identified by ingesting and augmenting records from multiple user accounts hosted by different services providers can be jointly queried, and transactions from within any of these records that match the query parameters can be returned.

At block 618, process 600 displays the set of transactions with added metadata. For example, the set of transactions can be displayed in an order or a grouping, such as sorted or grouped by any relevant piece of information for a transaction (e.g., information for transaction 554 displayed in FIG. 5B). Implementations display transactions along with the transaction's augmented metadata and/or sort and group transactions using the transaction's augmented metadata. In some implementations, the original result set can be further refined by providing additional query parameters for the result set.

Figure 7:
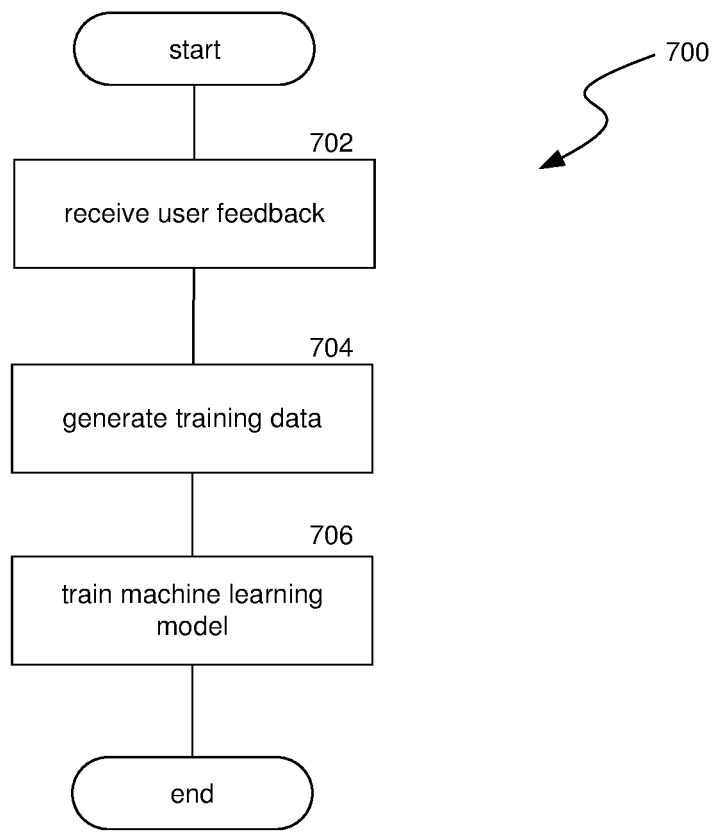
FIG. 7 is a flowchart illustrating components used in some implementations for generating training data for machine learning models.

FIG. 7 is a flowchart illustrating components used in some implementations for generating training data for machine learning models. In some implementations, process 700 is performed for a user account with cross-user account searching enabled. Process 700 can be triggered based on a user indication that the user would like the ability to query across user accounts.

At block 702, process 700 receives user feedback about transactions. For example, the user feedback can be a category for a transaction, an entity for a transaction, and any other suitable feedback. In some implementations, when a user enables cross-user account searching, the user may be prompted to tag certain ones of the transactions with categories or entities. The user can also provide feedback through an application on the user's device. For example, an incentive (e.g., discounts, early access to features, or other incentives) can be provided to users that manually tag transactions with categories and/or entities.

In some implementations, a machine learning model can be trained to predict categories for transactions and/or entities (e.g., parent entities) for transactions (as discussed in relation to FIG. 4). Some models may produce a confidence value with the prediction. In some implementations, a user can be prompted to provide feedback about transactions with a predicted entity or category and a low confidence interval for the prediction.

At block 704, process 700 aggregates the user feedback and generates training data. For example, the user feedback can be used to produce instances of transactions with corresponding transaction features (e.g., pieces of information relevant to the transaction) and labeled entities and/or categories. These instances can be aggregated into training data for a supervised machine learning model. At block 706, process 700 can train the machine learning model with the training data. For example, the training data can train one or more machine learning models to predict a category for a transactions and/or an entity for a transaction. Once trained, the model can be used, e.g., by discover entity 605 and/or by metadata generator 346 to generate metadata for received transactions.

The disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for ingesting, augmenting, and querying records across user accounts, the method comprising:
   ingesting records from a plurality of user accounts, wherein a first and second of the user accounts are hosted by different service providers, and the first and second user accounts comprise different ones of a credit card account, a debit card account, and a digital wallet account;
   processing the records to identify transactions and transaction parameters, wherein the identified transaction parameters include transaction times, entities that are parties to the transactions, and sums for the transactions;
   predicting, by a machine learning model for each of a first portion of the transactions, a parent transaction entity, wherein the machine learning model predicts a same parent entity for multiple of the first portion of transactions that comprise different identified entities;
   augmenting at least a portion of the identified transactions with metadata, wherein the augmented metadata comprises at least the parent transaction entity for the first portion of the transactions and a digital receipt for a second portion of the transactions;
   receiving a logical query comprising query parameters that include an entity parameter;
   retrieving a set of the identified transactions that match the query parameters, wherein transactions of the set comprise transaction parameters and/or augmented metadata that matches the entity parameter from the logical query, and the set of transactions are from records that span the first and second user accounts;
grouping first transactions of the set of transactions according to their parent entity; and
displaying the first transactions grouped according to their parent entity.

2. The method of claim 1, wherein the augmented metadata comprise a category for a third portion of the identified transactions.

3. The method of claim 2, wherein the categories for the third portion of transactions are generated based on features for the third portion of transactions using one or more of category rules, a trained machine learning model, or a combination thereof.

4. The method of claim 2, further comprising:
receiving user feedback that corrects a category for one of the third portion of transactions;
aggregating user feedback comprising corrected categories to update training data; and
training a machine learning model to categorize transactions using the training data.

5. The method of claim 2, wherein the query parameters comprise a category parameter and the set of identified transactions retrieved comprise augmented metadata that matches the category parameter.

6. The method of claim 1, wherein the different identified entities are associated with the same parent entity using the machine learning model and a set of entity association rules.

7. The method of claim 1, wherein the augmenting the portion of the identified transactions with metadata includes:
identifying a tracked location of the user at a time corresponding to a time of a particular transaction of the identified transactions; and
assigning the identified tracked location to the particular transaction.

8. The method of claim 1, further comprising:
aggregating a training set of digital receipts and corresponding identified transactions; and
processing the training set of digital receipts and corresponding identified transactions to generate or update training data about transaction entities, wherein the machine learning model is trained to predict parent transaction entities by the training data.

9. The method of claim 1, wherein one or more of the identified transactions augmented with metadata are part of both the first portion of transactions and second portion of transactions.

10. The method of claim 1, wherein the grouped first transactions comprise the same parent entity.

11. The method of claim 1, wherein the same parent entity comprises a disambiguated entity party to the first portion of transactions that encompasses the different identified entities.

12. A non-transitory computer-readable storage medium storing instructions that, when executed by a computing system, cause the computing system to perform a process for ingesting, augmenting, and querying records across user accounts, the process comprising:
ingesting records from a plurality of user accounts, wherein a first and second of the user accounts are hosted by different service providers, and the first and second user accounts comprise different ones of a credit card account, a debit card account, and a digital wallet account;
processing the records to identify transactions and transaction parameters, wherein the identified transaction parameters include transaction times, entities that are parties to the transactions, and sums for the transactions;
predicting, by a machine learning model for each of a first portion of the transactions, a parent transaction entity, wherein the machine learning model predicts a same parent entity for multiple of the first portion of transactions that comprise different identified entities;
augmenting at least a portion of the identified transactions with metadata, wherein the augmented metadata comprises at least the parent transaction entity for the first portion of the transactions and a digital receipt for a second portion of the transactions;
receiving a logical query comprising query parameters that include an entity parameter;
retrieving a set of the identified transactions that match the query parameters, wherein transactions of the set comprise transaction parameters and/or augmented metadata that matches the entity parameter from the logical query, and the set of transactions are from records that span the first and second user accounts;
grouping first transactions of the set of transactions according to their parent entity; and
displaying the first transactions grouped according to their parent entity.

13. The computer-readable storage medium of claim 12, wherein the augmented metadata comprise a category for a third portion of the identified transactions.

14. The computer-readable storage medium of claim 13, wherein the categories for the third portion of transactions are generated based on features for the third portion of transactions using one or more of category rules, a trained machine learning model, or a combination thereof.

15. The computer-readable storage medium of claim 13, wherein the process further comprises:
receiving user feedback that corrects a category for one of the third portion of transactions;
aggregating user feedback comprising corrected categories to update training data; and
training a machine learning model to categorize transactions using the training data.

16. The computer-readable storage medium of claim 13, wherein the query parameters comprise a category parameter and the set of identified transactions retrieved comprise augmented metadata that matches the category parameter.

17. The computer-readable storage medium of claim 12, wherein the different identified entities are associated with the same parent entity using the machine learning model and a set of entity association rules.

18. The computer-readable storage medium of claim 12, wherein the augmenting the portion of the identified transactions with metadata includes:
identifying a tracked location of the user at a time corresponding to a time of a particular transaction of the identified transactions; and
assigning the identified tracked location to the particular transaction.

19. A computing system for ingesting, augmenting, and querying records across user accounts, the computing system comprising:
one or more processors; and
one or more memories storing instructions that, when executed by the one or more processors, cause the computing system to perform a process comprising:
ingesting records from a plurality of user accounts, wherein a first and second of the user accounts are hosted by different service providers, and the first and second user accounts comprise different ones of a credit card account, a debit card account, and a digital wallet account;

processing the records to identify transactions and transaction parameters, wherein the identified transaction parameters include transaction times, entities that are parties to the transactions, and sums for the transactions;

predicting, by a machine learning model for each of a first portion of the transactions, a parent transaction entity, wherein the machine learning model predicts a same parent entity for multiple of the first portion of transactions that comprise different identified entities;

augmenting at least a portion of the identified transactions with metadata, wherein the augmented metadata comprises at least the parent transaction entity for the first portion of the transactions and a digital receipt for a second portion of the transactions;

receiving a logical query comprising parameters that include an entity parameter;

retrieving a set of the identified transactions that match the query parameters, wherein transactions of the set comprise transaction parameters and/or augmented metadata that matches the entity parameter from the logical query, and the set of transactions are from records that span the first and second user accounts;

grouping first transactions of the set of transactions according to their parent entity; and displaying the first transactions grouped according to their parent entity.

20. The computing system of claim 19, wherein the augmenting the portion of the identified transactions with metadata includes:

identifying a tracked location of the user at a time corresponding to a time of a particular transaction of the identified transactions; and assigning the identified tracked location to the particular transaction.

\* \* \* \* \*